Patented May 24, 1949

UNITED STATES PATENT OFFICE 2,470,946

2,2'-DITHIO BIS (N-ARYL CARBAMIC ESTER) SOFTENERS FOR RUBBERS

Philip T. Paul and Lyndon B. Tewksbury, Jr., Naugatuck, Conn., assignors to United States Rubber Company, New York, N. Y., a corporation of New Jersey No Drawing. Application March 15, 1945, Serial No. 582,988

18 Claims. (Cl. 260—30.8)

This invention relates to softeners for rubbers, and more particularly to the softening or plasticizing of natural rubbers, and synthetic rubbers, such as polymerized chloro-2-butadiene-1,3, copolymers of butadiene-1,3 and styrene, and copolymers of butadiene-1,3 and acrylonitrile.

We have discovered that 2,2'-dithio bis (N-aryl carbamic esters) in which the carboxyl groups are linked to aliphatic carbon atoms, are excellent softeners for natural rubber, and for synthetic rubbers such as polymers of butadienes-1,3 and copolymers of butadienes-1,3 with other polymerizable compounds which are capable of forming copolymers with butadienes-1,3. The 2,2'-dithio bis (N-aryl carbamic esters) which are the new softeners for various rubbers according to the present invention, may be designated by the general formula

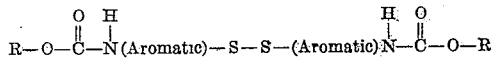

where R is a functionally aliphatic group, such as an alkyl or an aralkyl radical, and the nitrogens are in the ortho position to the sulphur atoms. Examples of the radical "R" are methyl, ethyl, n-propyl, iso-propyl, allyl, butyl, isobutyl, sec.-butyl, amyl, hexyl, heptyl, dodecyl, betachloro ethyl, betaethoxy ethyl, cyclohexyl, benzyl, phenethyl, naphthyl methyl. The aromatic nucleus of the general formula may be an arylene nucleus of the benzene, naphthylene or biphenyl series, which may be unsubstituted, save for the sulphur and amino group or which may otherwise be substituted as by such groups as alkyl, aryl, halogen, alkoxy, aryloxy, nitro, cyano, carbalkoxy and acyl. The preferred 2,2'-dithio bis (N-aryl carbamic esters) are the 2,2'-dithio bis (alkyl carbanilates) having the formula

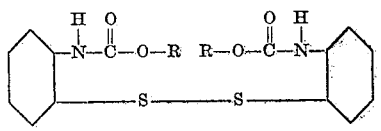

where R is the alkyl radical methyl, ethyl, or isopropyl. Other examples of 2,2'-dithio bis (N-aryl carbamic esters) in which the carboxyl groups are linked to aliphatic carbon atoms are 2,2'-dithio bis (methyl carbanilate)
2,2'-dithio bis (ethyl carbanilate)
2,2'-dithio bis (n-propyl carbanilate)
2,2'-dithio bis (n-butyl carbanilate)
2,2'-dithio bis (n-amyl carbanilate)
2,2'-dithio bis (n-heptyl carbanilate)
2,2'-dithio bis (n-dodecyl carbanilate)
2,2'-dithio bis (cyclohexyl carbanilate)
2,2'-dithio bis (benzyl carbanilate)
2,2'-dithio bis (ethyl N-1-naphthyl carbamate)
2,2'-dithio bis (ethyl 4-tert. butyl carbanilate)
2,2'-dithio bis (ethyl 4-chloro carbanilate)

These compounds may be prepared in a known manner by the action of the desired aliphatic chlorocarbonate on the selected 2,2'-dithio bis (aryl amine), according to the procedure of Child and Smiles, Journal of the Chemical Society (London) of 1926, p. 2696.

The amount of 2,2'-dithio bis (N-aryl carbamic ester) is not critical, generally amounts from about .5 to 5 parts or more per 100 parts of the rubber being used, depending on the particular chemical, the kind of rubber, and the degree of softening desired. The 2,2'-dithio bis (N-aryl carbamic ester), as is customary with plasticizers, is preferably mixed into the rubber before the usual vulcanizing ingredients, and after the rubber has become softened, compounding ingredients such as sulfur, zinc oxide, accelerators, antioxidants, fillers and the like, may be added.

Natural rubbers, such as *Hevea brasiliensis* and guayule, may be softened by mixing with a small amount of 2,2'-dithio bis (N-aryl carbamic ester) in a mixer, or on a mill at conventional milling temperature. Synthetic rubbers which are polymers of butadienes-1,3 and copolymers of butadienes-1,3 with other polymerizable compounds which are capable of forming copolymers with butadienes-1,3 are also readily plasticized by similarly incorporating therein a 2,2'-dithio bis (N-aryl carbamic ester). Such synthetic rubbers are known. Examples of synthetic rubbers which are polymers of butadienes-1,3 are polymerized butadiene-1,3, methyl-2-butadiene-1,3 (isoprene), chloro-2-butadiene-1,3 (chloroprene), piperylene, 2,3-dimethylbutadiene-1,3. Illustrative of other polymerizable compounds which are capable of forming copolymers with such butadienes-1,3, as referred to above, are compounds which contain a $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene and vinyl naphthalene; the alpha methylene carboxylic acids, and their esters, nitriles, and amides such as acrylic acid, methyl acrylate, methyl methacrylate, acrylonitrile, methacrylonitrile, methacrylamide; isobutylene; methyl vinyl ether; methyl vinyl ketone; vinylidene chloride. The expression "a rubber" as used herein refers to such natural and artificial rubbers. Present day commercial synthetic rubbers of the above types are polymerized chloro-2-butadiene-1,3, copolymers of butadiene-1,3 and styrene, and copolymers of butadiene-1,3 and acrylonitrile.

The following illustrate the softening or plasticizing effect of the preferred 2,2'-dithio bis (N-aryl carbamic esters) on various rubbers. In testing the effectiveness of a 2,2'-dithio bis (N-aryl carbamic ester), equal parts of the rubber are placed on two halves of a divided mill, having its rolls heated to approximately 250° F. At this temperature the rubber quickly smooths out, forming two separate continuous sheets around the roll. As soon as these continuous sheets have been formed, the chemical to be tested is added to one of these sheets. The milling of both sheets is continued for ten minutes, after which the two sheets are removed from the mill and allowed to stand at room temperature for about 24 hours. After such rest, the two samples, namely, the control sheet to which no chemical had been added, and the sheet to which the particular 2,2'-dithio bis (N-aryl carbamic ester) had been added, were tested in a Mooney shearing disc plastometer. This instrument has been described by M. Mooney in Industrial and Engineering Chemistry (Anal. Ed.) 6, 147 (1934). By means of this device, the viscosity of a plastic material in shear may be readily and quantitatively measured. The readings recorded in the data in the following examples are viscosity readings after four minutes between platens of the instrument at 212° F., a one minute warm up period being used. The readings are based on an arbitrary standard, the lower the readings, the lower the viscosity and hence the greater the plasticity.

The following table of Mooney viscosities on various samples of commercial general purpose GRS rubber (copolymer of 75 parts butadiene-1,3 and 25 parts styrene) containing 2 parts of various 2,2'-dithio bis (N-aryl carbamic esters) per 100 parts of the GRS rubber and the corresponding control samples in each case, illustrate the effectiveness of these chemicals as softeners for GRS rubber.

| 2,2'-dithio bis (N-aryl carbamic ester) | Mooney Viscosity | |
|---|---|---|
| | Control | With Chemical |
| 2,2'-dithio bis (methyl carbanilate) | 37 | 15 |
| 2,2'-dithio bis (ethyl carbanilate) | 35 | 20 |
| 2,2'-dithio bis (isopropyl carbanilate) | 37 | 17 |

In tests on natural Hevea rubber, a sample containing 0.5 parts of 2,2'-dithio bis (ethyl carbanilate) gave a Mooney viscosity of 20 whereas the control was 60.

In tests on neoprene synthetic rubber (polymerized chloro-2-butadiene-1,3), a sample containing 2 parts of 2,2'-dithio bis (isopropyl carbanilate) gave a Mooney viscosity of 30, whereas the control was 50.

The above clearly illustrates the plasticizing or softening effect on rubbers of 2,2'-dithio bis (N-aryl carbamic esters). Rubbers which may be mixed with 2,2'-dithio bis (N-aryl carbamic esters) according to the present invention may be mixed with various other compounding ingredients, for example, other softeners, pigments, fillers, vulcanizing agents, accelerators, antioxidants and the like, and may be vulcanized in the conventional manner.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A composition of matter comprising material selected from the group consisting of natural rubber, synthetic rubber polymers of butadienes-1,3 themselves, and synthetic rubber copolymers of butadienes-1,3 with a compound which contains a single $CH_2=C<$ group and is copolymerizable with butadienes-1,3, and, as a softener therefor, a 2,2'-dithio bis (N-aryl carbamic ester) in which the carboxyl groups are linked to aliphatic carbon atoms of radicals containing not more than 12 carbon atoms and selected from the group consisting of alkyl, haloalkyl, alkoxyalkyl, cycloalkyl and aralkyl radicals, the said 2,2'-dithio bis (N-aryl carbamic ester) being present in a quantity not more than 5 parts per 100 parts of the rubber.

2. A composition of matter comprising material selected from the group consisting of natural rubber, synthetic rubber polymers of butadienes-1,3 themselves, and synthetic rubber copolymers of butadienes-1,3 with a compound which contains a single $CH_2=C<$ group and is copolymerizable with butadienes-1,3, with which is admixed 0.5 to 5 parts per 100 parts of the rubber of a 2,2'-dithio bis (N-aryl carbamic ester) in which the carboxyl groups are linked to aliphatic carbon atoms of radicals containing not more than 12 carbon atoms and selected from the group consisting of alkyl, haloalkyl, alkoxyalkyl, cycloalkyl and aralkyl radicals.

3. A composition of matter comprising material selected from the group consisting of natural rubber, synthetic rubber polymers of butadienes-1,3 themselves, and synthetic rubber copolymers of butadienes-1,3 with a compound which contains a single $CH_2=C<$ group and is copolymerizable with butadienes-1,3, and, as a softener therefor, a 2,2'-dithio bis (alkyl carbanilate) having not more than 12 carbon atoms in each alkyl group, the said 2,2'-dithio bis (alkyl carbanilate) being present in a quantity not more than 5 parts per 100 parts of the rubber.

4. A composition of matter comprising material selected from the group consisting of natural rubber, synthetic rubber polymers of butadienes-1,3 themselves, and synthetic rubber copolymers of butadienes-1,3 with a compound which contains a single $CH_2=C<$ group and is copolymerizable with butadienes-1,3, with which is admixed 0.5 to 5 parts per 100 parts of the rubber of a 2,2'-dithio bis (alkyl carbanilate) having not more than 12 carbon atoms in each alkyl group.

5. A composition of matter comprising material selected from the group consisting of natural rubber, synthetic rubber polymers of butadienes-1,3 themselves, and synthetic rubber copolymers of butadienes-1,3 with a compound which contains a single $CH_2=C<$ group and is copolymerizable with butadienes-1,3, and, as a softener therefor, 2,2'-dithio bis (ethyl carbanilate), the said 2,2'-dithio bis (ethyl carbanilate) being present in a quantity not more than 5 parts per 100 parts of the rubber.

6. A composition of matter comprising material selected from the group consisting of natural rubber, synthetic rubber polymers of butadienes-1,3 themselves, and synthetic rubber copolymers of butadienes-1,3 with a compound which contains a single $CH_2=C<$ group and is copolymerizable with butadienes-1,3, with which is admixed 0.5 to 5 parts of 2,2'-dithio bis (ethyl carbanilate) per 100 parts of the rubber.

7. A composition of matter comprising a synthetic rubber copolymer of butadiene and styrene, and, as a softener therefor, a 2,2'-dithio bis (N-aryl carbamic ester) in which the carboxyl groups are linked to aliphatic carbon atoms of radicals containing not more than 12 carbon atoms and selected from the group consisting of alkyl, haloalkyl, alkoxyalkyl, cycloalkyl and aralkyl radicals, the said 2,2'-dithio bis (N-aryl carbamic ester) being present in a quantity not more than 5 parts per 100 parts of the rubber.

8. A composition of matter comprising a synthetic rubber copolymer of butadiene and styrene with which is admixed 0.5 to 5 parts per 100 parts of the rubber of a 2,2'-dithio bis (N-aryl carbamic ester) in which the carboxyl groups are linked to aliphatic carbon atoms of radicals containing not more than 12 carbon atoms and selected from the group consisting of alkyl, haloalkyl, alkoxyalkyl, cycloalkyl and aralkyl radicals.

9. A composition of matter comprising a synthetic rubber copolymer of butadiene and styrene, and, as a softener therefor, a 2,2'-dithio bis (alkyl carbanilate) having not more than 12 carbon atoms in each alkyl group, the said 2,2'-dithio bis (alkyl carbanilate) being present in a quantity not more than 5 parts per 100 parts of the rubber.

10. A composition of matter comprising a synthetic rubber copolymer of butadiene and styrene with which is admixed 0.5 to 5 parts per 100 parts of the rubber of a 2,2'-dithio bis (alkyl carbanilate) having not more than 12 carbon atoms in each alkyl group.

11. A composition of matter comprising a synthetic rubber copolymer of butadiene and styrene, and, as a softener therefor, a 2,2'-dithio bis (ethyl carbanilate), the said 2,2'-dithio bis (ethyl carbanilate) being present in a quantity not more than 5 parts per 100 parts of the rubber.

12. A composition of matter comprising a synthetic rubber copolymer of butadiene and styrene with which is admixed 0.5 to 5 parts of 2,2'-dithio bis (ethyl carbanilate) per 100 parts of the rubber.

13. The method of plasticizing material selected from the group consisting of natural rubber, synthetic rubber polymers of butadienes-1,3 themselves, and synthetic rubber copolymers of butadienes-1,3 with a compound which contains a single $CH_2=C<$ group and is copolymerizable with butadienes-1,3, which comprises mixing therein a 2,2'-dithio bis (N-aryl carbamic ester) in which the carboxyl groups are linked to aliphatic carbon atoms of radicals containing not more than 12 carbon atoms and selected from the group consisting of alkyl, haloalkyl, alkoxyalkyl, cycloalkyl and aralkyl radicals, the said 2,2'-dithio bis (N-aryl carbamic ester) being in a quantity not more than 5 parts per 100 parts of the rubber.

14. The method of plasticizing material selected from the group consisting of natural rubber, synthetic rubber polymers of butadienes-1,3 themselves, and, synthetic rubber copolymers of butadienes-1,3 with a compound which contains a single $CH_2=C<$ group and is copolymerizable with butadienes-1,3, which comprises mixing therein a 2,2'-dithio bis (alkyl carbanilate) having not more than 12 carbon atoms in each alkyl group, the said 2,2-dithio bis (alkyl carbanilate) being in a quantity not more than 5 parts per 100 parts of the rubber.

15. The method of plasticizing material selected from the group consisting of natural rubber, synthetic rubber polymers of butadienes-1,3 themselves, and synthetic rubber copolymers of butadienes-1,3 with a compound which contains a single $CH_2=C<$ group and is copolymerizable with butadienes-1,3, which comprises mixing 2,2'-dithio bis (ethyl carbanilate) therein, the said 2,2'-dithio bis (ethyl carbanilate) being in a quantity not more than 5 parts per 100 parts of the rubber.

16. The method of plasticizing a synthetic rubber copolymer of butadiene-1,3 and styrene which comprises mixing therein a 2,2'-dithio bis (N-aryl carbamic ester) in which the carboxyl groups are linked to aliphatic carbon atoms of radicals containing not more than 12 carbon atoms and selected from the group consisting of alkyl, haloalkyl, alkoxyalkyl, cycloalkyl and aralkyl radicals, the said 2,2'-dithio bis (N-aryl carbamic ester) being in a quantity not more than 5 parts per 100 parts of the rubber.

17. The method of plasticizing a synthetic rubber copolymer of butadiene-1,3 and styrene which comprises mixing therein a 2,2'-dithio bis (alkyl carbanilate) having not more than 12 carbon atoms in each alkyl group, the said 2,2'-dithio bis (alkyl carbanilate) being in a quantity not more than 5 parts per 100 parts of the rubber.

18. The method of plasticizing a synthetic rubber copolymer of butadiene-1,3 and styrene which comprises mixing 2,2'-dithio bis (ethyl carbanilate) therein, the said 2,2'-dithio bis (ethyl carbanilate) being in a quantity not more than 5 parts per 100 parts of the rubber.

PHILIP T. PAUL.
LYNDON B. TEWKSBURY, Jr.

No references cited.